United States Patent
Der Matheossian

(10) Patent No.: US 8,196,389 B2
(45) Date of Patent: Jun. 12, 2012

(54) METHOD FOR LIMITING THE AIR INTAKE NOISE GENERATED AT THE END OF THE REGENERATION OF THE EXHAUST GAS POST-TREATMENT SYSTEM

(75) Inventor: Jean-Yves Der Matheossian, Paris (FR)

(73) Assignee: Renault S.A.S., Boulogne Billancourt (FR)

( * ) Notice: Subject to any disclaimer, the term of this patent is extended or adjusted under 35 U.S.C. 154(b) by 364 days.

(21) Appl. No.: 12/519,230

(22) PCT Filed: Dec. 4, 2007

(86) PCT No.: PCT/EP2007/063232
§ 371 (c)(1),
(2), (4) Date: Aug. 19, 2009

(87) PCT Pub. No.: WO2008/071591
PCT Pub. Date: Jun. 19, 2008

(65) Prior Publication Data
US 2010/0043401 A1   Feb. 25, 2010

(30) Foreign Application Priority Data
Dec. 14, 2006  (FR) ..................... 06 55497

(51) Int. Cl.
*F01N 3/00* (2006.01)
(52) U.S. Cl. ............... 60/285; 60/274; 60/278; 60/280; 60/295; 123/184.53; 123/406.52; 123/568.16
(58) Field of Classification Search .................. 60/274, 60/276, 278, 280, 285, 295, 297; 123/184.53, 123/406.46, 406.51, 406.52, 568.19
See application file for complete search history.

(56) References Cited

U.S. PATENT DOCUMENTS

| | | | |
|---|---|---|---|
| 6,634,345 B2 * | 10/2003 | Yoshizaki et al. | 123/568.12 |
| 6,957,642 B2 * | 10/2005 | Miura | 123/399 |
| 6,969,413 B2 * | 11/2005 | Yahata et al. | 55/282.3 |
| 7,021,051 B2 * | 4/2006 | Igarashi et al. | 60/295 |
| 7,100,365 B2 * | 9/2006 | Nishizawa et al. | 60/285 |
| 7,296,561 B2 * | 11/2007 | Shirakawa et al. | 123/493 |
| 7,716,920 B2 * | 5/2010 | Onodera et al. | 60/295 |
| 2005/0172613 A1 | 8/2005 | Blomquist | |
| 2006/0137660 A1 | 6/2006 | Shirakawa et al. | |
| 2007/0012030 A1 | 1/2007 | Shirakawa | |

FOREIGN PATENT DOCUMENTS

| | | |
|---|---|---|
| EP | 1 106 804 | 6/2001 |
| EP | 1 674 698 | 6/2006 |
| EP | 1 679 430 | 7/2006 |
| WO | 03 102391 | 12/2003 |

* cited by examiner

Primary Examiner — Binh Q Tran
(74) Attorney, Agent, or Firm — Oblon, Spivak, McClelland, Maier & Neustadt, L.L.P.

(57) ABSTRACT

A control method for an internal combustion engine including an exhaust gases post-processing system and a system for recirculating the exhaust gases towards the intake, wherein the engine can be switched from a regeneration operation mode with throttling to a nominal mode without throttling. At the end of the engine operation in the regeneration mode, the engine is temporarily operated in an intermediate mode with partial throttling for limiting the contrast of the intake noise.

13 Claims, 2 Drawing Sheets

METHOD FOR LIMITING THE AIR INTAKE NOISE GENERATED AT THE END OF THE REGENERATION OF THE EXHAUST GAS POST-TREATMENT SYSTEM

BACKGROUND

The invention relates to a control method for an internal combustion engine, in particular a Diesel engine, comprising an exhaust gas post-treatment system and a system for recirculating exhaust gases to the intake, the engine changing from a regeneration mode operation with throttling to a normal mode without throttling.

To meet emission control standards, internal combustion engines are equipped with post-treatment systems which trap and convert certain chemical compounds contained in the exhaust gases. Some post-treatment systems use an internal regeneration phase during which the operation of the engine is changed in order to establish favorable thermal and chemical conditions in the post-treatment system. These specific conditions promote the conversion of the chemical compounds which have been trapped in the post-treatment system.

These favorable conditions are usually obtained by reducing the performance of the engine by partial closing of the air intake circuit, which increases, particularly, the temperature of the exhaust gases.

Once the regeneration phase has passed, the aim is to open the air intake circuit as quickly as possible to limit the overconsumption of fuel and the transient production of certain chemical compounds contained in the exhaust gases.

However, for reasons of efficiency, these regeneration programs use high degrees of intake duct closure which create a significant reduction of the noise of the air intake circuit for the whole duration of the process.

At the end of the regeneration, by rapidly opening the intake ducts, the noise suddenly becomes loud again without the driver having changed the acceleration signal of the vehicle, which disturbs the auditory comfort of the occupants and may monopolize their attention.

BRIEF SUMMARY

The invention aims to improve on prior art systems and proposes to remedy their disadvantages, particularly to limit the perceived noise contrast, particularly at stable engine speed, when returning to a normal operation of the engine after a regeneration phase.

One object of the present invention is to provide an engine control method of the type mentioned above comprising a step in which the engine is made to operate temporarily in intermediate mode by carrying out a partial throttling to limit the intake noise contrast, at the end of the regeneration mode operation of the engine.

According to the particular embodiments, the control method for an internal combustion engine includes one or more of the following features:

- the engine is made to change from an intermediate mode operation with partial throttling to a normal mode without throttling when at least one signal is detected, which masks the intake noise contrast by the change in the engine noise occurring in connection with the detection of the signal;
- the engine is made to change from an intermediate mode operation with partial throttling to a normal mode without throttling when an acceleration signal is detected, which masks the intake noise contrast by the change in the engine noise due to the change in the acceleration;
- the opening speed of an intake flap is controlled when switching from the regeneration mode with throttling to the intermediate mode with partial throttling, which optimizes the duration of the intermediate mode;
- in a first opening phase of the intake flap, there is a rapid change to a first partial throttling value corresponding to a first intake noise attenuation value, which reduces the duration of the intermediate mode;
- in a second opening phase of the opening flap, the opening speed of the flap is limited according to at least one intake noise rate-of-increase signal;
- in a third phase, the partial throttling value is maintained until an acceleration signal of the vehicle is applied, which ensures that the occupants do not perceive the intake noise contrast;
- the opening speed of the intake flap is made to vary according to a logarithmic function so that the rate of variation of the intake noise is generally constant;
- during the intermediate mode, the cross section of flow of the gases in the EGR system is reduced to lessen the contrast of the total noise emitted by the intake circuit, which improves the reduction of the total intake noise contrast;
- the engine is changed from an intermediate mode operation to a normal mode after a timed period, which ensures that it will be possible to return to the more economical normal mode after a certain preset period; and
- the timed period is adjusted according to an additional consumption value and/or a value for the production of certain chemical compounds during the intermediate mode.

BRIEF DESCRIPTION OF THE DRAWINGS

Other features and advantages of the invention will emerge clearly on reading the following description of the non-limiting embodiment of the invention, in connection with the attached drawings, in which.

DETAILED DESCRIPTION

In the description which follows, it is understood that "throttling" refers to the action of reducing the cross section of flow of a gas which is introduced into a duct, for example an air intake duct in the engine. Moreover, "regeneration mode" refers to the operating mode of the engine in which an internal regeneration of the post-treatment systems is carried out with a throttling. A "normal mode" refers to an operating mode of the engine in which no regeneration and no throttling are carried out. Finally, an "intermediate mode" refers to an operating mode of the engine in which a partial throttling is carried out.

Figure 1:
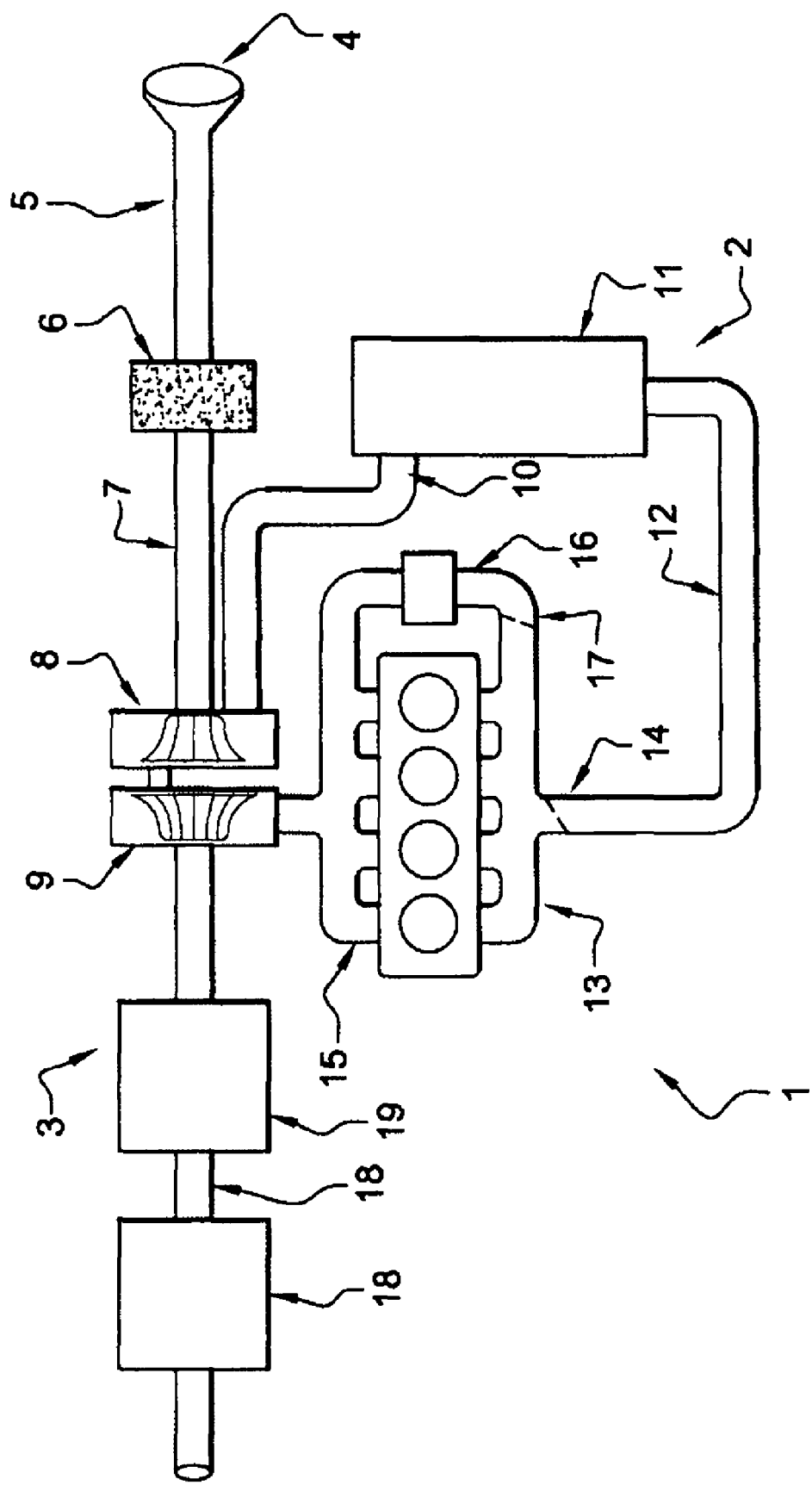
FIG. 1 is a structural diagram of an engine on which the invention is used.

FIG. 1 illustrates the structure of an engine 1 on which the invention is used.

The engine 1 comprises an air intake circuit 2 and an exhaust circuit 3. The intake circuit 2 has an air intake port 4, through which enters the air which is brought to an air filter 6 through an intake duct upstream of the air filter 5. The air continues its journey, through a duct upstream of a compressor 7, to a compressor 8, driven by a turbocharger 9 set in motion by exhaust gases. There the air is compressed and sent to an intercooler 11 via a duct upstream of the cooler 10. After cooling, the air is brought through a duct located downstream of the cooler 12 to an air intake manifold 13. The flow of air entering the manifold 13 is then adjusted by an intake flap 14.

The air entering the engine 1 plays an active part in the internal combustion producing the exhaust gases which are discharged into the exhaust circuit 3 through an exhaust manifold 15.

A first portion of the exhaust gases is recirculated to the intake to limit the emission of certain pollutants by an exhaust gas recirculation circuit 16, called an "EGR circuit." The quantity of exhaust gases recirculated is adjusted by a recirculation circuit valve 17, called an "EGR valve."

A second portion of the exhaust gases activates the turbo 9 then passes into an exhaust pipe 18 comprising an exhaust gas post-treatment system 19.

The operation of the engine 1 creates a vibrational excitation which is propagated inside the air intake circuit 2 and which creates a noise called intake "roar." At the time of the regeneration of the exhaust gas post-treatment systems 19, when an air intake flap 14 closes at least partially the cross section of the circuit 2, the propagation of the vibrational excitation coming from upstream is attenuated downstream of the flap 14.

Figure 2:
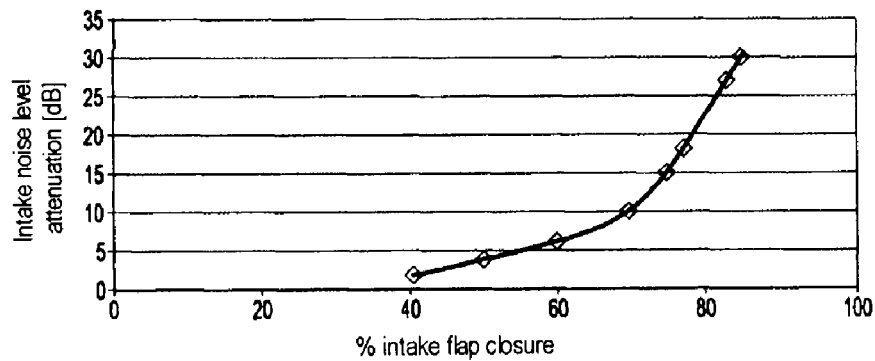
FIG. 2 is a graph showing the intake noise attenuation value obtained according to the closure of the intake flap.

As illustrated in FIG. 2, the attenuation of the level of intake roar increases with the throttling at the intake. More particularly, it can be seen on this graph that the level of attenuation of the intake noise follows an exponential curve according to the degree of closure of the intake flap 14. It is therefore particularly advantageous to move this flap 14 according to a logarithmic speed setting in order that the rate of increase of the roar is linear.

This throttling also lessens noises of a lower intensity, downstream of the intake flap 14, such as, for example, the vibrations and the noise produced by the components of the intake circuit 2 and the air filter 6.

In the remainder of the description of the invention, intake noise will be mentioned to refer to the roar as well as the vibrations and the noise produced by the components of the intake circuit 2, and generally any vibrational excitation which is propagated in the intake circuit 2.

At the end of regeneration, the flap 14 opens the intake circuit 2 and the intake noise level noticeably increases. This increase is all the more disadvantageous as the circuit 2 is opened as quickly as possible to return to the normal mode and thus limit the over-consumption and the emission of certain pollutants. The transition is then clearly drawn to the attention of the occupants at the end of the regeneration phase, affecting their auditory comfort.

According to the invention, the engine is then put temporarily into an intermediate operating mode at the end of regeneration mode before returning to a normal mode without throttling. This intermediate mode limits the intake noise contrast. The intermediate mode next changes to the normal mode, when an acceleration signal is changed. This signal change can be either an acceleration signal or a deceleration signal.

The intermediate mode can also change to the normal mode when a manual or automatic transmission gear shift signal is detected.

It is also possible to use other signals corresponding to changes of sound levels, such as the radio volume or a fan speed for example.

In addition to the reduction of the intake noise contrast, the intermediate mode limits the over-consumption and the emission of certain pollutants compared to the regeneration mode. However, this intermediate mode remains less advantageous in terms of consumption and the production of certain chemical compounds than the normal mode. The aim is therefore to change to the normal mode as soon as possible, when the conditions ensure that the occupants will not be bothered by a high noise contrast.

Figure 3:
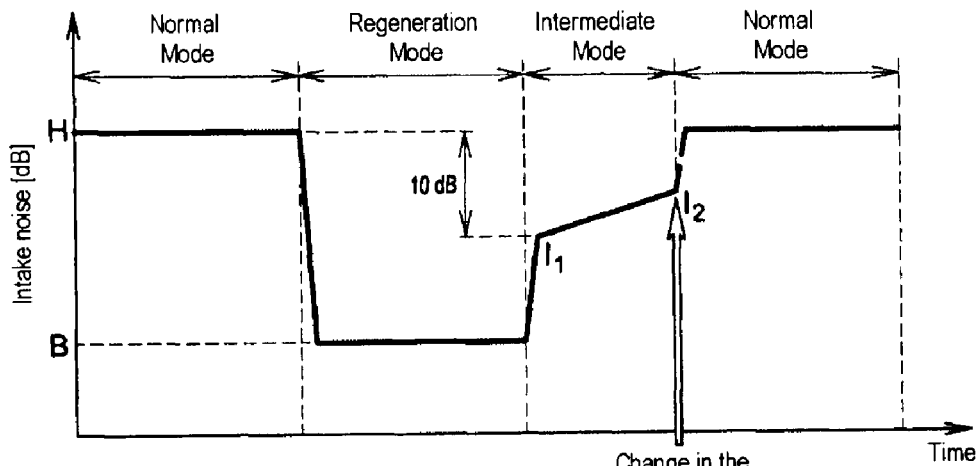
FIG. 3 shows the intake noise variations with time for several throttling parameters in the various operating modes of the engine according to a first embodiment.

FIG. 3 illustrates the intake noise variations with time for several throttling parameters in the various operating modes of the engine 1, according to a first embodiment. The readings are carried out with a stable engine speed and load on the engine 1.

When the engine 1 is operating in normal mode, without throttling, the intake noise level is high, and rises to a value H. In regeneration mode, the intake noise level only rises to a value B. A phase during which the engine is operating in an intermediate mode, during which the throttling is partial, is inserted between the end of regeneration mode and the change to normal mode. During this intermediate mode, the noise level gradually returns from the low value B to the high value H.

In a first period following the end of the regeneration mode, the noise level varies rapidly to return to a value I1 of which the noise difference from B cannot be heard by the occupants, or, in other words, the value I1 is a threshold value above which the rate of variation of the noise level must be limited so that the noise is not perceptible by the occupants. To do that, the intake circuit 2 is rapidly opened. For example, this value can be a value 10 dB less than the value H. This limits the duration for which the engine is operating at high levels of over-consumption, at the same time ensuring that the occupants cannot perceive, by ear, the end of the regeneration mode.

In a second period, the noise level is gradually raised from this value I1 by the appropriate movement of the flap 14. The speed of movement of the flap 14 is limited to a maximum speed, above which the occupant starts to perceive a rapid variation of the intake noise level.

This second period lasts until an acceleration signal of the vehicle is detected, from which the noise level increases rapidly by accelerating the movement of the flap 14. Thus the intake noise contrast is successfully masked, by the change in noise perceived by the occupant when the acceleration signal of the vehicle changes.

Figure 4:
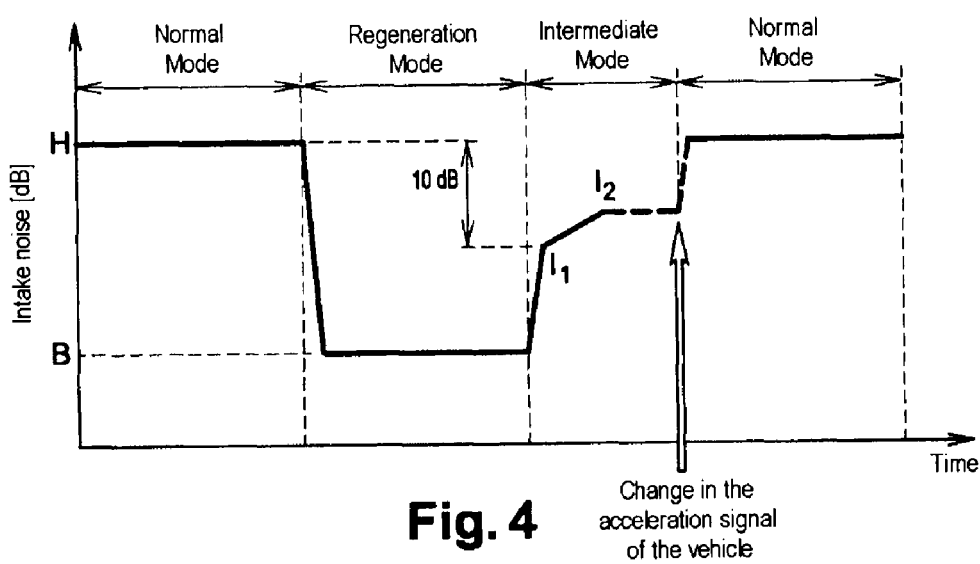
FIG. 4 shows the intake noise variations with time for several throttling parameters in the various operating modes of the engine according to a second embodiment.

According to a second embodiment, illustrated in FIG. 4, the intermediate mode in which the engine 1 is operating between the regeneration mode and the normal mode comprises additional steps compared with the first embodiment. The readings are carried out with a stable engine speed and load on the engine 1.

In a first period following the end of the regeneration mode, the noise level varies rapidly to return to the value I1. The value I1 is a threshold value above which the rate of variation of the noise level must be limited so that the noise is not perceptible by the occupants. To do that, the intake circuit 2 is opened rapidly. For example, this value can be a value 10 dB less than the value H. This limits the duration for which the engine is operating at high levels of over-consumption, at the same time ensuring that the occupants do not perceive, by ear, the end of the regeneration mode.

In a second period, the noise level is gradually raised from this value I1 by the appropriate movement of the flap 14 up to a value I2, which is a second threshold value. This value I2 is, for example, a noise level associated with a limited adjustment of the combustion above which the over-consumption and the production of chemical compounds compared with the normal mode is acceptable.

In a third period, the movement of the intake flap 14 is blocked, so that the intake noise level remains constant and equal to 12.

This third period continues until the detection of an acceleration signal of the vehicle, from which the noise level increases rapidly by increasing the speed of movement of the flap 14. Thus the intake noise contrast is successfully masked by the change in noise perceived by the occupant when the acceleration signal of the vehicle changes.

It is apparent from the foregoing that the system according to this second embodiment has many advantages, provided that the difference between the high H and low B noise levels is very great and that the rate of variation of the intake noise is small, which results in a period in which the engine remains in the intermediate mode for a very long time.

According to a third embodiment, during the intermediate mode, the throttling carried out at the intake flap 14 results in an adjustment of the opening signal of the EGR valve 17 of the recirculation circuit 16.

In regeneration mode, the opening of the EGR valve 17 is smaller that its opening in normal mode. When this EGR valve 17 is open, pulses from the exhaust are partially transmitted to the intake circuit 2. It follows that for certain operating phases of the engine 1, the EGR circuit 16 plays an active part in the intake noise contrast when the regeneration mode changes to the normal mode.

When the engine is operating in intermediate mode, with partial throttling of the intake flap 14, the proportion of air in the air/fuel mixture which plays an active part in the combustion is lower. The EGR valve 17 then has a smaller opening compared with the normal mode operation, with the aim of adjusting the proportions of the air/fuel mixture and limiting the exhaust emission of certain chemical compounds.

In this intermediate mode, the EGR valve 17 is in a position of partial throttling which lessens the contribution of the EGR circuit to the intake noise contrast when the regeneration mode changes to the normal mode.

What is more, according to the invention, it is understood that it is not limited to cases in which the EGR gases are taken from the exhaust manifold. For example, it is possible to take the gases for the EGR system downstream of an exhaust gas post-treatment system.

The invention claimed is:

1. A control method for an internal combustion engine including an exhaust gas post-treatment system and a system for recirculating exhaust gases to an intake, the method comprising:
    ending a regeneration mode of engine operation with intake throttling;
    causing the engine to operate temporarily in an intermediate mode after the ending of the regeneration mode by carrying out a partial throttling to reduce intake noise contrast; and
    causing the engine to change from an intermediate mode of operation with partial throttling to a normal mode without throttling when at least one signal is detected, wherein:
    the at least one signal includes an acceleration signal,
    the intake throttle is oriented in a first position at the end of the regeneration mode,
    during the intermediate mode, the intake throttle is opened from the first position to a second position, and
    after the intake throttle reaches the second position during the intermediate mode, a rate of opening the intake throttle is limited to less than a maximum speed in order to limit a rate of intake noise increase.

2. The control method as claimed in claim 1, wherein an opening speed of an intake flap is controlled when switching from the regeneration mode with throttling to the intermediate mode with partial throttling.

3. The control method as claimed in claim 2, wherein during a first opening phase of the intake flap, there is a rapid change in an intake flap position to the second intake throttling position corresponding to a first intake noise attenuation value.

4. The control method as claimed in claim 3, wherein during a second opening phase of the intake flap, the opening speed of the intake flap is limited according to at least one intake noise rate-of-increase signal.

5. The control method as claimed in claim 4, wherein during a third opening phase of the intake flap, the partial throttling value is maintained until the acceleration signal of the vehicle is detected.

6. The control method as claimed in claim 2, wherein the opening speed of the intake flap is made to vary according to a logarithmic function so that a rate of variation of the intake noise is generally constant.

7. The control method as claimed in claim 1, wherein during the intermediate mode, a flow cross section of an exhaust gas recirculation (EGR) system is reduced to lessen a contrast of total noise emitted by an intake circuit.

8. The control method as claimed in claim 1, wherein the engine is made to change from the intermediate mode operation to the normal mode after a timed period.

9. The control method of claim 3, wherein the first intake noise attenuation value is about 10 decibels.

10. A control method for an internal combustion engine including an exhaust gas post-treatment system and a system for recirculating exhaust gases to an intake, the method comprising:
    ending a regeneration mode of engine operation with intake throttling;
    causing the engine to operate temporarily in an intermediate mode after the ending of the regeneration mode by carrying out a partial throttling to reduce intake noise contrast; and
    causing the engine to change from an intermediate mode of operation with partial throttling to a normal mode without throttling when at least one signal is detected, wherein:
    the at least one signal corresponds to a change of sound level,
    the intake throttle is oriented in a first position at the end of the regeneration mode,
    during the intermediate mode the intake throttle opens from the first position to a second position, and
    after the intake throttle reaches the second position during the intermediate mode, a rate of opening the intake throttle is limited to less than a maximum speed in order to limit a rate of intake noise increase.

11. The control method of claim 10, wherein the at least one signal includes a signal selected from the group consisting of a vehicle acceleration signal, a manual transmission gear shift signal, an automatic transmission gear shift signal, an exhaust gas recirculation valve signal, a radio volume signal, and a fan speed signal.

12. The control method of claim 10, wherein the at least one signal is a signal selected from the group consisting of a vehicle acceleration signal, a manual transmission gear shift signal, an automatic transmission gear shift signal, a radio volume signal, and a fan speed signal.

13. The control method of claim 10, wherein the at least one signal is a vehicle acceleration signal.

* * * * *